May 13, 1930. P. M. LOCKWOOD 1,758,232
ADVERTISING DEVICE
Filed Oct. 9, 1926  2 Sheets-Sheet 1
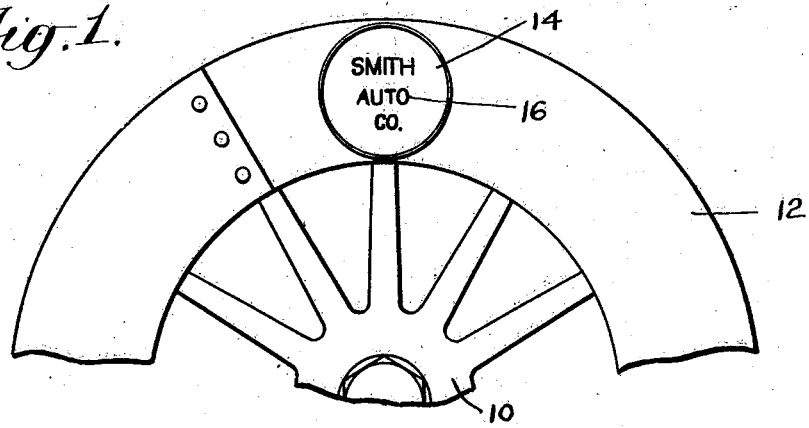
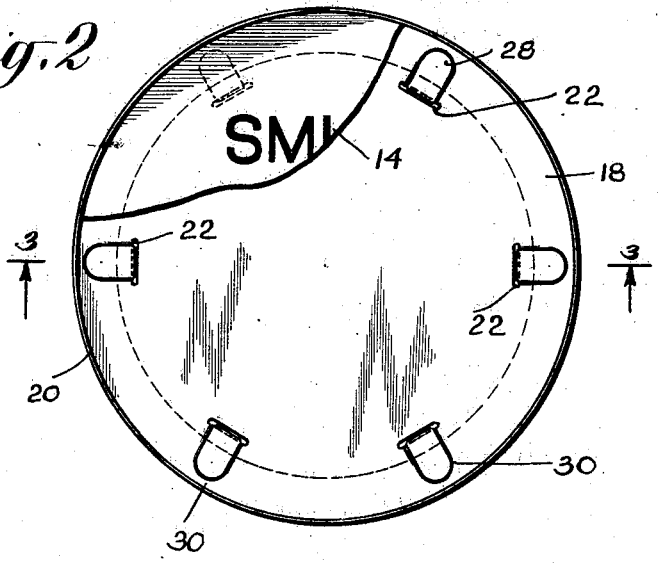
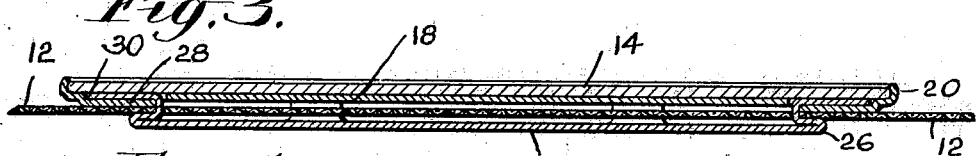
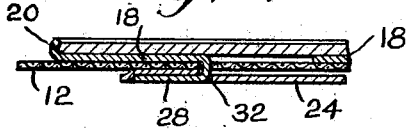
Inventor
P. M. Lockwood
By his Attorneys
Cooper, Kerr & Dunham May 13, 1930.  P. M. LOCKWOOD  1,758,232
ADVERTISING DEVICE
Filed Oct. 9, 1926  2 Sheets-Sheet 2
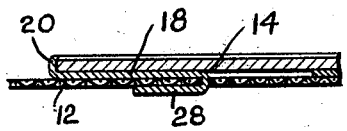
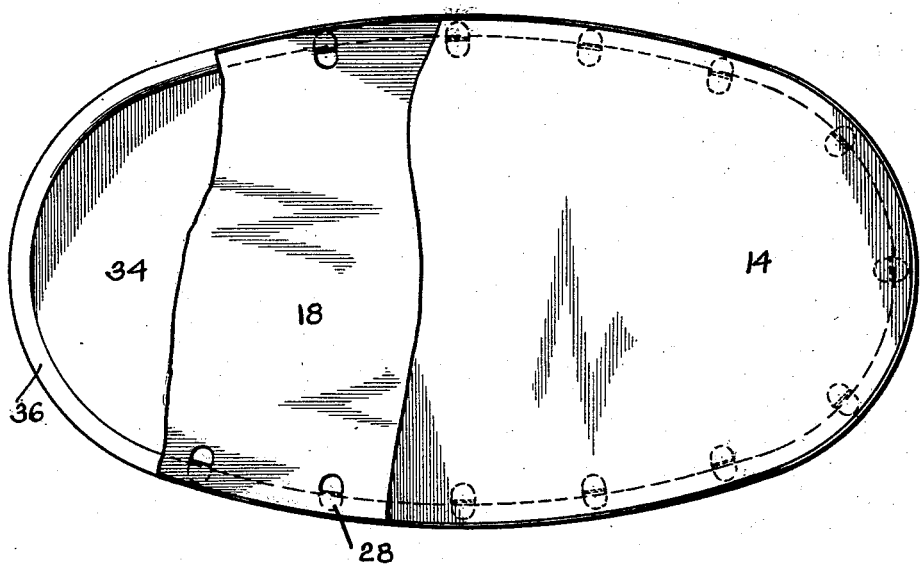
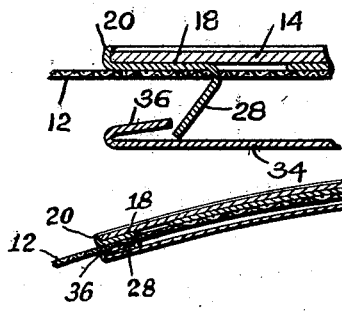
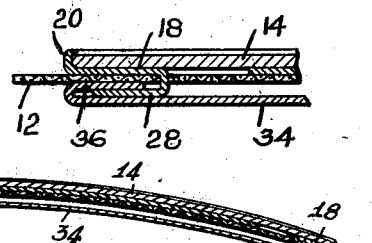
Inventor
P. M. Lockwood
By his Attorneys
Cooper, Kerr & Dunham.

Patented May 13, 1930

1,758,232

UNITED STATES PATENT OFFICE

PAUL M. LOCKWOOD, OF IRVINGTON, NEW JERSEY

ADVERTISING DEVICE

Application filed October 9, 1926. Serial No. 140,459.

This invention pertains to new and useful improvements in advertising devices.

It is the principal object of the invention to provide a device suitable for securing advertising matter to cloth and other fabric.

It is another object of the invention to provide a device suitable for supporting advertising matter on the cover of the spare tire on an automobile.

It is another object of the invention to provide a device which is moderately flexible in construction so as to be able to conform to curved surfaces such as tire covers, and yet stiff enough to prevent creasing or kinking of the advertising card or unit.

It is another object of the invention to provide such a device which will be attractive in appearance, cheap to manufacture, and durable in service.

Further and other objects and advantages will be hereinafter set forth in the accompanying specification and claims, and shown in the drawings, which by way of illustration show what is now considered to be the preferred embodiment of the invention.

Fig. 1 shows the device supporting an advertising unit, on the cover of a spare tire.

Fig. 2 is an enlarged view of one modification of the device with the front plate partly broken away to show the interior construction.

Fig. 3 is a section on line 3—3 of Fig. 2.

Fig. 4 is a sectional detail similar to Fig. 3, but showing an optional construction.

Fig. 5 is a cross sectional detail of still another modification.

Fig. 6 is a front view of still another modification, partly broken away to show front and back plates.

Figs. 7 and 8 are enlarged cross sectional details showing steps in the process of applying the device shown in Fig. 6.

Fig. 9 shows the complete device curved to show the flexible nature thereof.

The device is suitable for use in connection with fabric of any kind, but it finds its principal use in attaching advertising cards or units of paper, cardboard, celluloid, cloth, metal or any suitable material, bearing names or slogans, to spare tire covers, therefore the device is illustrated for that purpose.

The wheel 10 represents a spare wheel mounted on the rear or side of an automobile and 12 is the cover enclosing the tire thereon. 14 is an advertising unit supported by the device 16 which forms the subject of the present invention.

The construction of one form of the device will be readily understood from Figs. 2 and 3. The outer disc-like member 18 is provided with an outer rim 20 which is crimped over the outer edge of card 14 to hold it in place.

For clarity of illustration the metal is shown as having considerable thickness, but in actual practice such is not the case. The sheet metal of which the device is composed is really very thin—so thin in fact as to readily conform to curved surfaces such as tire covers. However, the metal is stiff enough to prevent creasing or kinking of the advertising unit in ordinary service.

The plane portion of disc 18 is perforated with a number of slots 22.

On the other side of fabric 12 is another disc-like member 24 folded inwardly around its rim 26 and provided with projecting teeth or prongs 28 spaced to correspond to slots 22 in member 18.

To attach the device to the tire cover, plate 18 is held in its desired position while teeth 28 of disc 24 are pushed through fabric 12 into and through slots 22. The teeth 28 are then bent over or clinched on the front of disc 18, thereby gripping fabric 12 tightly between front and rear plates 18 and 24 respectively.

If desired, plate 18 may be provided with recesses 30 to accommodate teeth 28 after they are bent over, thus leaving an unobstructed front surface on plate 28 to receive the card 14 which is put in place after the device is secured to the fabric as above described, being held in position by the crimping inwardly of rim 20.

It is not necessary that members 18 and 24 be in the form of discs. They may be of skeleton form if desired, and may be square, elliptical, or any other preferred shape. The disc form is preferable, however, as it presents fewer opportunities for the collection of dust and dirt.

An optional form of construction is shown in Fig. 4, in which the teeth 28 are formed on the front plate 18 and pass through fabric 12 into and through slots 32 in rear plate 24, being clinched over plate 24 to grip the fabric between the plates.

Fig. 5 shows a modification for use in connection with certain kinds of fabrics. It is similar to the design in Fig. 4 except that back plate 24 is dispensed with entirely and the teeth 28 are bent over into direct contact with fabric 12.

The modification shown in Figs. 6, 7, 8 and 9 is like Fig. 4 in all details except the back plate and methods of engaging teeth 28 with the back plate, which is designated 34. Plate 34 is not slotted, but is provided with a turned in flange 36 around its rim. After teeth 28 are passed through the fabric they are bent to the position shown in Fig. 7, so that when plates 18 and 34 are pressed together teeth 28 will enter the space between back plate 34 and its flange 36, and when the plates are pressed still further together, teeth 28 and flange 36 will automatically lock together and finally assume the form shown in Fig. 8 in which, as in the previously described modifications, the fabric is firmly engaged between the front plate 18 and back plate 34.

It is to be understood that the invention is not limited to the specific construction herein illustrated and described but can be embodied in other forms without departure from its spirit as defined by the following claims.

I claim—

1. A device for attaching an advertising unit to fabric, comprising in combination, a flexible plate-like member arranged to support the unit on the front side of the fabric, means for clamping the unit to said member, an auxiliary flexible plate-like member on the rear side of the fabric, a plurality of teeth fast to one of said members, said teeth being arranged to pass through the fabric and engage the other of said members by bending the ends of said teeth, and means for concealing said teeth, said device when assembled being flexible, whereby it may conform to the curved surface of an automobile tire cover.

2. A device for attaching an advertising unit to fabric, comprising in combination, a pair of clamping flexible plate-like members, a plurality of teeth on one of said members and arranged to pass through the fabric and engage the other member, a projecting rim on one of said members for holding the card on said member, and a flexible rim on the other of said members for concealing said teeth, said device when assembled being flexible, whereby it may conform to the curved surface of an automobile tire cover.

3. A device for attaching an advertising unit to fabric, comprising in combination, a flexible plate-like member arranged to support the unit on the front side of the fabric, an auxiliary flexible plate-like member on the rear side of the fabric, and a plurality of teeth fast to one of said members, said teeth being arranged to pass through the fabric and automatically engage the other of said members when said members are pressed together, said other members serving to conceal said teeth, said device when assembled being flexible, whereby it may conform to the curved surface of an automobile tire cover.

4. A device for attaching an advertising unit to fabric, comprising in combination, a flexible plate-like member having a rim arranged to support the unit on the front side of the fabric, an auxiliary flexible plate-like member on the rear side of the fabric, a plurality of teeth fast to said members inwardly from the rim thereof, and a flexible rim-like flange on the other of said members, said teeth being arranged to pass through the fabric and automatically engage said flexible flange when said members are pressed together, said flange serving to conceal said teeth when the device is in service, said device when assembled being flexible, whereby it may conform to the curved surface of an automobile tire cover.

In testimony whereof I hereto affix my signature.

PAUL M. LOCKWOOD.